UNITED STATES PATENT OFFICE.

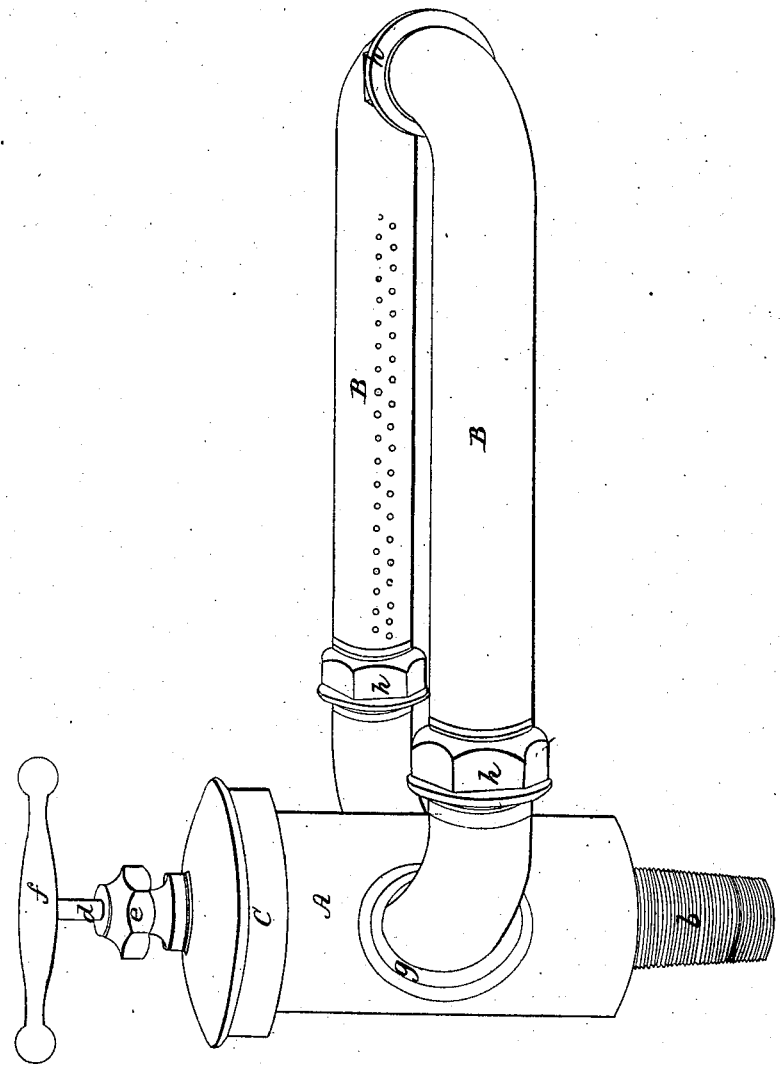

ALEXANDER ANDERSON, OF MILWAUKEE, WISCONSIN.

IMPROVEMENT IN APPARATUS FOR WASHING THE FELTS OF PAPER-MACHINES.

Specification forming part of Letters Patent No. 44,059, dated September 6, 1864.

*To all whom it may concern:*

Be it known that I, ALEXANDER ANDERSON, of the city and county of Milwaukee, in the State of Wisconsin, have invented new and useful Improvements in the Apparatus employed for Washing Felts in the Process of Manufacturing Paper, which I denominate the "Self-Acting Felt-Washer;" and I do hereby declare that the following is a full and exact description thereof, reference being had to the accompanying drawings, and to the letters of reference marked thereon.

The nature of my invention consists in dispensing with the beaters heretofore used in felt-washers, and with the machinery, power, and friction upon the felts necessary and incident to the use of them, and in using instead thereof a continuous or endless tube passing around the felts, from which tube minute jets of water are forcibly projected upon each surface of the felt in use through perforations in the side of the tube, the water being supplied to the perforated tube by means of an elevated fountain or a force-pump.

The advantages of my invention are: first, the beaters, with the machinery, presser, and friction on the felts necessary and incident to them are dispensed with and avoided; second, the beaters being dispensed with, the nap and bodies of the felts are not worn by them; third, the felts for this reason will last one-half longer; fourth, the self-acting felt-washer keeps the felts always clean, and hence they do not require to be removed from the machinery and subjected to other mechanical processes to cleanse them, and from this fact they are rendered still more durable; fifth, the beaters being dispensed with, the felts run steadily, and without the waving or oscillation caused by them, and which produces the unevenness of lamel so often observed in paper; sixth, the saving of power, wear upon the felts, the time occupied in removing the felts from the machines for occasional cleansing, and time of machines while this is being done render my invention not half as expensive as the apparatus heretofore used; seventh, this method of washing leaves the nap of the felts in a condition to couch far better than when subjected to the action of beaters.

To enable others skilled in the art to make and use my invention, I will proceed to describe its construction and operation.

I construct of some suitable material a hollow main cylinder or tube, as shown at A in the accompanying drawings. The base of this cylinder or tube is contracted, as shown at $b$, to form a throttle, through which the water is to be received from the fountain, or force-pump. Upon the neck of this throttle a thread or screw is cut, as shown at $k$ in order that the cylinder may be readily attached to a reservoir or pipe. The contraction of the cylinder-base, as stated, forms a valve-seat, upon which a suitable valve is made to rest, by the means hereinafter described, whenever it is desired to shut off the water. The other end of the cylinder is closed water-tight by means of a cap, (shown at $c$,) which is screwed onto the end of the cylinder. In the center or apex of the cap $c$ is an aperture or hole, supplied or guarded by a water tight stuffing-box, through which is an opening only sufficient to admit the valve-rod, (shown at $d$ in the drawings.) The valve-rod $d$ is made long enough to extend through the cylinder to the throttle. The lower end of the rod $d$ is supplied with a valve, plug, or disk, to serve as a valve to close the throttle when depressed upon or into it. The valve-rod, for a sufficient distance, where it is in contact with the nut of the stuffing-box $e$, has cut upon it a coarse thread or screw, which is designed to work in a corresponding female thread or screw cut in the nut $e$, itself, as a means of opening and closing the throttle by raising or depressing the valve. The projecting end of the valve-rod at $d$ is supplied with a handle or T, as shown at $f$, to facilitate the working of the valve. On each side of the main cylinder and at opposite points an opening is made of the same size with the caliber of the tube to be used. To these openings the tube B B is to be firmly attached water-tight, as shown at $g$ in the drawings. The tube B B should spring from or leave the openings in the main cylinder with a curve, which will bring the straight sections of the tube at B B at right angles to the transverse axis of the main cylinder and exactly parallel with each other through their perforated extent, as shown in the drawings. After being extended at such angle a sufficient length the tube is carried back upon itself to the opening on the opposite side of the cylinder, where it is again attached to the cylinder, so that in its departure, course and return the tube will describe an oblate elliptic figure, as it appears in the drawings. The inner and opposing side of each straight section of the tube at B, respectively, is perforated with two or more rows of small holes, as shown at B, through which the water is projected upon the opposite surfaces of the felts. These perforations should extend along the two straight sections of the tube for a distance equal to the breadth of the felt to be used.

The tube is made in sections, coupled together, so as to form a continuous or endless tube, by means of unions or right and left sockets, as shown at $h\ h\ h$ in the drawings. The tube is so made in order that it may be readily taken apart to remove any sediment which may accumulate. The tube is made continuous, in order to equalize the force with which the water is projected upon the opposite surfaces of the felt.

To operate or use my invention, the apparatus is so placed that the felt, as it is moved forward by the machine, will pass between and equidistant from the straight and parallel sections of the tube B B. The valve is then raised by properly turning the T or handle $f$ when the water will be forced from the fountain or force-pump into the main cylinder A and the tube B B, and projected through the perforations in the latter equally upon both surfaces of the felt, keeping them perfectly clean and free from adhering pulp, size, or other substance.

What I claim as my invention, and desire to secure by Letters Patent, is—

The method of washing felts, in the process of manufacturing paper, by projecting jets of water upon both surfaces of the felt while in motion by means of an apparatus to be constructed and operated substantially as herein described.

ALEXANDER ANDERSON.

Witnesses:
  I. P. WALKER,
  JNO. MILLER.